United States Patent
Fribus

(10) Patent No.: US 10,252,617 B2
(45) Date of Patent: Apr. 9, 2019

(54) ACTUATING DEVICE AND METHOD FOR SELECTING SHIFT STAGES OF A VEHICLE TRANSMISSION WITH SHIFT-BY-WIRE ACTUATION

(71) Applicant: ZF Friedrichshafen AG, Friedrichshafen (DE)

(72) Inventor: Vitali Fribus, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 672 days.

(21) Appl. No.: 14/897,124

(22) PCT Filed: May 12, 2014

(86) PCT No.: PCT/EP2014/059594
§ 371 (c)(1),
(2) Date: Dec. 9, 2015

(87) PCT Pub. No.: WO2014/198468
PCT Pub. Date: Dec. 18, 2014

(65) Prior Publication Data
US 2016/0137063 A1    May 19, 2016

(30) Foreign Application Priority Data
Jun. 11, 2013  (DE) .................. 10 2013 210 833

(51) Int. Cl.
*B60K 37/06*   (2006.01)
*B60K 35/00*   (2006.01)
*F16H 59/08*   (2006.01)
*F16H 63/42*   (2006.01)

(52) U.S. Cl.
CPC .............. *B60K 37/06* (2013.01); *B60K 35/00* (2013.01); *F16H 59/08* (2013.01); *F16H 63/42* (2013.01);
(Continued)

(58) Field of Classification Search
CPC .................... B60K 37/06; B60K 35/00; B60K 2350/1024; B60K 2350/1052;
(Continued)

(56) References Cited

U.S. PATENT DOCUMENTS

2014/0149909 A1* 5/2014 Montes .................. B60K 35/00
715/771
2014/0283639 A1* 9/2014 Kim ........................ F16H 59/08
74/473.12

(Continued)

FOREIGN PATENT DOCUMENTS

DE   10 2007 042650 A1   3/2009
DE   10 2009 031649 A1   1/2011
(Continued)

OTHER PUBLICATIONS

International Search Report dated Jul. 31, 2014 in International Application No. PCT/EP2014/059594 (3 pages).
(Continued)

*Primary Examiner* — Huan Le
(74) *Attorney, Agent, or Firm* — Brinks Gilson & Lione

(57) ABSTRACT

The present invention relates to an actuating device for selecting shift stages of a vehicle transmission with shift-by-wire actuation. The actuating device has a touch screen having at least one display section for displaying a selectable shift stage and a contact section to select the displayed shift stage. The actuating device is characterized in that the display section and the contact section form a common display and contact section, and that the touch screen comprises a confirmation section which is adjacent to the display and touch section for displaying the selected shift stage, and is coupled to the display and touch section such that by a contacting sweep of the touch screen from the display and contact section to the confirmation section a displayed selectable shift stage can be selected for effective switching position of the change gear.

20 Claims, 2 Drawing Sheets

Figure 1:
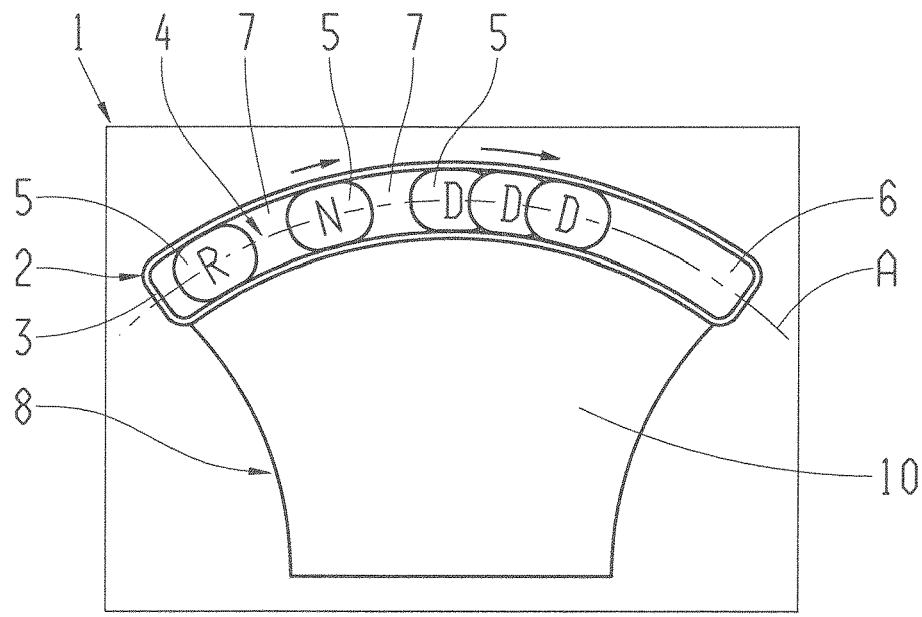

(52) U.S. Cl.
CPC ............... *B60K 2350/1024* (2013.01); *B60K 2350/1052* (2013.01); *B60K 2350/1076* (2013.01); *F16H 2063/423* (2013.01)

(58) Field of Classification Search
CPC . B60K 2350/1076; F16H 59/08; F16H 63/42; F16H 2063/423
See application file for complete search history.

(56) References Cited

U.S. PATENT DOCUMENTS

| | | | |
|---|---|---|---|
| 2014/0318295 A1* | 10/2014 | Kim | F16H 59/08 74/473.12 |
| 2015/0053038 A1* | 2/2015 | Kim | F16H 59/105 74/473.3 |

FOREIGN PATENT DOCUMENTS

| | | |
|---|---|---|
| DE | 10 2011 112566 A1 | 3/2012 |
| JP | 2006 177401 A | 7/2006 |
| WO | 2012/147942 A1 | 11/2012 |

OTHER PUBLICATIONS

International Search Report dated Jul. 31, 2014 in International Application No. PCT/EP2014/059594 (11 pages)(German Language).
Office Action from corresponding DE 10 2013 210 833.8, dated Feb. 27, 2014 (7 pages)(including English translation of p. 5).

* cited by examiner

ACTUATING DEVICE AND METHOD FOR SELECTING SHIFT STAGES OF A VEHICLE TRANSMISSION WITH SHIFT-BY-WIRE ACTUATION

This application is a filing under 35 U.S.C. § 371 of International Patent Application PCT/EP2014/059594, filed May 12, 2014, and claims the priority of DE 10 2013 210 833.8, filed Jun. 11, 2013. These applications are incorporated by reference herein in their entirety.

The present invention relates to an actuating device and a method for selecting shift stages of a vehicle transmission with shift-by-wire actuation.

Usually, shift stages of a vehicle transmission are selected by means of a gear selector lever or gear shift lever arranged within the reaching area of the driver's hands. The gear selector lever or gear shift lever comprises at least one shift gate, in which the gear selector lever or gear shift lever for selecting a shift stage is mechanically moved. The gear selector lever or gear shift lever is coupled to a sensor, which in the respective selected position of the gear selector lever or gear shift lever transmits an electric signal to a transmission control that corresponds to the selected shift stage assigned to the particular position. Conventional shift stages are the reverse driving mode "R", the forward driving mode "D" for drive, the neutral position "N", the manual gear upshift stage "+", the manual gear downshift stage "−" and the parking brake position "P". In addition, further keys such as "S" for the sport mode are known. These gear selector lever or gear shift lever devices, however, require a corresponding installation space and are sometimes not intuitive or easy to use.

DE 10 2007 042 650 A1 discloses a space-saving and easy-to-use control panel for manual operation of a motor vehicle transmission. The control panel has a screen and a touch screen, wherein the screen is provided for displaying a shift position of the transmission and the touch screen is designed for changing the shift position of the motor vehicle by touching. The screen and the touch screen are coordinated with one another so that a selection of a shift stage is performed according to the type of drag-and-drop principle by touching an icon that appears next to a display location of a shift stage, and a subsequent touching of the touch screen and dragging of the symbol over a central section up to an area adjacent to a display location of another shift stage and then releasing the touch screen.

JP 2006-177401 A discloses a similarly handled control panel, wherein the symbol at the display location of the shift stage appears so as to be touched and moved for the selection of the shift stage to another shift stage by passing a finger over the touch screen.

The present invention provides an alternative, in particular improved actuating device based on the drag and drop principle, where the proposed actuating device has a simple and inexpensive design which allows a secure and at the same time particularly simple changing of the shift stage.

The proposed actuating device has a touch screen. Such a touch screen may be based on a capacitive, resistive, optical or acoustic principle. In a capacitive touch screen the screen surface is equipped with an electrical field produced by accordingly arranged electrodes. An interface with the touch screen causes a detectable change in the electric field, whereby the exact position of the contact point can be determined. In a resistive touch screen, the screen surface is formed by two electrically conductive films spaced from each other by spacers. By applying a suitable pressure on the top film facing a user, it comes into electrically conductive contact with the other lower film, whereby the exact position of the contact point can be determined. The optical touch screen is characterized in that the screen surface is covered with a grid of light beams through appropriately arranged lighting elements and associated light-sensitive sensors. At the location of the touch point, the light grid is interrupted, whereby the exact position of the contact point can be determined. In the acoustic touch screen, the screen is formed of glass, wherein a pattern of ultrasonic waves is produced in the glass by a correspondingly suitable arrangement of transducers and reflectors. After contact with the screen surface a sound is generated which changes the ultrasonic wave pattern, whereby a position of the contact point can be determined. For the proposed actuating device, a capacitive or resistive touch screen is particularly preferred because they are inexpensive, safe and easy to use. The touch screen has, at least in terms of the structural design, a structure known from the prior art.

The touch screen also has at least a display and touch field for displaying and selecting a selectable shift stage. In other words, an area of the touch screen is divided in such a way that at least one section of the touch screen surface defining a display and actuation field is used to display at least or exactly a shift stage such as a reverse gear R, a forward gear D, a neutral position N or parking brake position P. The touch screen area used for display defines the size of the display and the touch field and is selected with such dimensions that the shift stage is easily perceptible or recognizable by a user. Further shift stages may well be added for displaying and selecting by further display and touch fields. Preferably, the displayable shift stage can be changed by a turntable coupled to the touch screen like a scroll function in the display and touch field. The turntable can be part of the actuating device or a component independent from the actuating device. The turntable may comprise for example a form well-known from conventional navigation systems installed in the vehicle. The turntable may comprise in addition to the rotation function additional function keys elements such as pushbuttons elements whose operation is backed by a predetermined function. For example, the turntable can comprise as part of the actuating device a function button to engage the parking brake. The function keys element can be provided so decoupled by the rotation function from the turntable that the function keys element does not rotate when the turntable is rotating. For this purpose, the turntable may include a central region girded by a rotary ring, which includes the function button element, wherein the rotary ring is movable in rotation around the central region.

In addition, the display and touch field is designed touch-sensitive. In other words, the touch screen has a touch-sensitive surface at the location of the display and touch field to perform an action when the display and touch field is touched. In accordance with the present invention, such action is the selection of a displayed shift stage by touching the display and touch field, wherein a corresponding signal is triggered at a control device by touching the display and touch field, which signals the contact and therefore the selection of the shift stage. Such a control device can be for example a controller which controls the touch screen.

According to the present invention, the touch screen is characterized in that in addition to the display and touch field it comprises a touch-sensitive confirmation field for confirmation of a selected shift stage and for displaying the selected shift stage. The confirmation field is arranged adjacent to the display and touch field. In other words, the touch screen surface is divided in such a way that at least one display and touch field and a confirmation field are provided, which can be activated in each case by touch and trigger an action or a signal. Between the display and touch field and the confirmation field is preferably provided an intermediate area, which is likewise designed touch-sensitive. Alternatively, the display and touch field and the confirmation field can adjoin one another.

The confirmation field is coupled to the display and touch field such that by passing the finger over the touch screen or the touch screen surface from the display and touch field up to the confirmation field, a displayed selectable shift stage can be selected and confirmed for effective switching position of the vehicle transmission. The actuating device thus makes use of the drag-and-drop principle. As described above, the selection of the selectable shift stage is done by touching the display and touch field. A confirmation of the selected shift stage occurs after pulling the selected shift stage by passing a finger over the touch screen up to the confirmation field at least by reaching the confirmation field. Already upon reaching the confirmation field while touching the touch screen, the actuating device can send a signal that carries the information which shift stage has been selected. Preferably, the confirmation of the selected shift stage occurs only after the confirmation field assumes a non-contact state. In other words, the signal is preferably only dispatched when, after reaching the confirmation field, a user takes off his finger from the confirmation field. The process of passing the finger over the display and touch field up to the confirmation field can be associated with the selection process or alternatively the confirmation process. Further alternatively, the process of the passing sweep can be considered to be an operation independent from the selection and confirmation.

Preferably, the touch screen is designed so that the shift stage displayed in the display and touch field and selected by touching during the contacting sweep can be displayed up to the confirmation field. The display of the selected shift stage can be continuous or flashing. A user can thus be shown throughout the process from the selection of the shift stage up to the confirmation of the shift stage which shift stage has been selected and is pending to be confirmed. As long as the switching signal has not been issued by the actuating device, the user can reconsider the shift stage selection and make a change of the shift stage selection.

Further preferably, the touch screen is designed such that the selected shift stage after its confirmation moves back to its original position. This allows to visually display the selected shift stage to a user.

According to a preferred embodiment of the present invention, the touch screen comprises for each display and touch field indicating the shift stage an associated touch-sensitive confirmation field. To simplify an intuitive handling of the actuating device, the display and touch fields are arranged along a first row, the assigned confirmation fields being arranged along a second row adjacent to the first row. The rows can be arranged along a straight line or a curve, preferably a circular arc-shaped curve or parallel to a vehicle longitudinal direction or parallel to a vehicle lateral direction. A row arrangement along an arc-shaped curve, which extends in the direction of a vehicle transverse direction, and further preferably adapted to a hand shape, is particularly preferred if the actuating device is to be actuated by a user's hand. Thus could be provided several display and touch fields, each indicating one selectable shift stage, which may be assigned to predetermined fingers of a user. The user could thus easily intuitively make a shift stage selection and confirm it by applying respective contacting sweep to the touch screen towards the confirmation field, and then by reaching the confirmation field or removing his finger from the confirmation field.

According to a preferred embodiment of the present invention, different shift stages can be confirmed and displayed by the touch-sensitive confirmation field. Thus, the number of the touch-sensitive confirmation fields can be reduced. For example, in the aforementioned preferred case of only one display and touch field, by which different displayable shift stages can be selected, for example by means of the turntable, only one confirmation field can be provided. In an alternatively preferred case, in which at least two display and touch fields can be present, needs also only be provided one confirmation field common for both display and touch fields. This also applies to an actuating device with a touch screen display with more than two display and touch fields.

According to a preferred embodiment of the present invention, the touch screen comprises several touch-sensitive display and touch fields, by which at least one shift stage can be viewed and selected, and a common touch-sensitive confirmation field assigned to the display and touch fields, wherein the display and touch fields and the common confirmation field are arranged along a row and wherein the touch sensitivity of the touch screen can be so controlled that upon touching one of the screen and touch fields, the touching sensitivity of another at least one touch-sensitive display and touch field provided between the display and touch field and the confirmation field is deactivated.

Thus, in case of a contacting sweep from one display and touch field over another display and contact field to the confirmation field, an accidental selection of the shift stage displayed by the other display and touch field can be prevented. For example, however, such a deactivation needs not be made when between the display and touch field and the confirmation field is no other display and touch field. Alternatively, all the other display and touch fields could be deactivated. The touch sensitivity of the touch screen can be adjusted accordingly as needed. The touch screen can be controlled and regulated by a control device, wherein the control device can be preferably part of the touch screen, the actuating device or other control means for controlling at least one other vehicle function.

The sequence can be configured as described above. The touch screen can thus be formed in a direction transverse to the row arrangement to save space. The confirmation field is preferably provided on the outside in the row arrangement. Also preferred is only one selectable shift stage to be assigned to each display and touch field for the display and selection. This allows an intuitive and simple operation of the actuating device.

According to a further alternatively preferred embodiment of the present invention, the touch screen comprises several touch-sensitive display and touch fields by means of which at least one shift stage is viewable and selectable, and a common touch-sensitive confirmation field, wherein the display and touch fields are arranged along a row, and wherein said confirmation field is arranged adjacent to the row. The sequence can be configured as described above. The touch screen can thus be formed narrow in the direction of the row arrangement.

Preferably, the confirmation field extends parallel to the row arrangement. Further preferably the confirmation field extends over all display and touch fields arranged in the row. More preferably, the confirmation field closes on the outer side with the outer sides of the display and touch fields arranged in the row. For the purposes of the present invention, under the phrases "on the outside" or "on the outer side" we understand to be the area close to an edge of the actuating device, which is within the delimiting edge of the actuating device. More preferably, the confirmation field protrudes outside beyond the outer sides of the display and touch fields arranged in the row on the outside. Thus, the shift stage selection and the shift stage confirmation process can be performed in a straight line and with a short movement from the corresponding display and touch field up to the common confirmation field, whereby a rapid switch and a faster gear change is possible.

Also preferred is each of the display and touch fields being assigned only one selectable shift stage for display and selection. This allows an intuitive and simple operation of the actuating device.

Particularly preferably the touch screen as described above is so controlled that upon the touch of one of the display and touch fields, the touch sensitivity of at least one of the other, or more preferably all other touch-sensitive display and touch fields is deactivated. Thus, a simultaneous selection and confirmation of various shift stages can be reliably prevented.

According to a preferred embodiment of the present invention the touch sensitivity of the touch screen is so controlled that the touch sensitivity of a display and touch field, which is assigned to the predetermined shift stage for displaying and selecting and whose shift stage is active, is deactivated until a selection and confirmation of another shift stage or until the vehicle ignition is actuated. This can reliably avoid that the same shift stage is consecutively selected and confirmed on several occasions.

According to a preferred embodiment of the present invention, the touch screen comprises on its screen surface at least one haptic element in an area of the display and touch field or the confirmation field or in an area between two display and touch fields or in an area between the display and touch field and the confirmation field. Preferably, the at least one haptic element is arranged in the respective area close to the edge. Close to the edge in the sense of the present invention is a distal area extending from an edge of the corresponding area to a half of the area, which extends from the border area to a center of the area. The proximal area extending from the half up to the middle of the field defines an interior area. For the display and touch field or for the confirmation field, the area corresponds to the expansion of the corresponding touch-sensitive field. For an intermediate area, the area corresponds to the expansion of the intermediate area.

Preferably, the haptic element can be located in an area which is adjacent to a display and touch field, a confirmation field or an intermediate area. This arrangement can signal to a user, for example, during a contacting sweep of the touch screen that a display and touch field or a confirmation field or an intermediate region is left or reached. The haptic element can be formed, for example, as a screen surface sink.

Further, there may be provided in an area at least two spaced-apart and mutually aligned parallel haptic elements. Further preferably, these haptic elements can bound a display and touch field, a confirmation field or an intermediate area. These haptic elements can thus signal a user the extent of the respective field or area.

More preferably, the haptic elements have a direction of extension towards a preferably adjacent display and touch field or a preferably adjacent confirmation field. Thus the haptic elements can form a guide from a field or an area to an adjacent field or area, whereby a user learns intuitively, in which direction the contacting sweep for shift stage selection and confirmation must be done. The handling of the actuating device can thus be simplified.

The shape of the haptic element is freely selectable. The haptic element may take any shape as long as the shape is suitable for the intended function, such as a limitation, guide or signal for leaving or reaching a field or area.

A haptic element may preferably consist of a single element or of several individual elements. For example, a haptic element formed by an elongated elevation or depression can be perceived as an elongated haptic element. Such elevation or depression perceived as an elongated haptic can alternatively be formed by several point-like or needle-head-shaped elevations or depressions arranged in a row.

According to a preferred embodiment of the present invention, the actuating device forms a handle with a surface facing the user of the actuating device, on which is arranged the touch-sensitive touch screen, wherein the handle comprises a switching element arranged outside of the touch screen for activating or deactivating a parking brake function of the vehicle. More preferably, the switching element for activation and deactivation of the parking brake is provided. Such a switching element can be, for example, a conventional pushbutton element. The pushbutton element is coupled to a control device, for example a transmission controller, such that when the parking brake is deactivated, by pressing the pushbutton element the parking brake is activated. Alternatively or additionally, the coupling may be such that when the parking brake is activated, by pressing the pushbutton element the parking brake is deactivated.

Preferably, the handle surface has in the cross-section an ergonomic shape adapted to a palm. More preferably, the handle has in the cross-section a surface shape corresponding to a computer mouse, whereby a user can put his hand comfortably on the handle or the handle surface to operate or actuate the actuating device. The width of the handle surface can be adjusted as needed so that a user can put his hand on the handle surface preferably at least partially, for example, with the heel of his hand and two or more fingers, or more preferably completely. The touch screen is preferably arranged such that it is visible to the user and the user can operate the touch screen with his fingers.

According to a preferred embodiment of the present invention, the handle comprises a movable free end and a fixed enclosed end, between which the touch-sensitive touch screen is disposed, wherein the switching element is designed and arranged such that by moving the free end, the parking brake function can be activated or deactivated. Such a switching element may be, for example, an inductive or optical sensor disposed at the free end, which can trigger a signal by moving the free end. Alternatively, the switching element can be preferably a micro-switch which is arranged in the area of the enclosed end such that by moving the free end, for example by pulling or pushing, the micro-switch in the area of the enclosed end is activated. The enclosed end defines a pivot axis for the free end, about which the free end is movable.

The enclosed end may be preferably enclosed so it can rotate. The enclosing can be done for example by a support member carrying the actuating device such as a housing element. The housing element can preferably be part of a vehicle center console. The enclosed end may alternatively be clamped stationary, wherein the handle is configured in a range between the touch screen and the enclosed end made of a flexible material. The preferred micro-switch is arranged for actuation in the flexible section of the handle. The micro-switch or the switching element may be arranged on the handle or alternatively in an area of the handle such that it can be effectively operated for switching by moving the handle.

More preferably, the handle is constructed tableau-like or disc-shaped with the handle surface particularly preferably having an ergonomic shape adapted to a palm. Thereby the handle is formed economic and handy for pulling or pushing operation and easy to use.

According to a preferred embodiment of the present invention, the actuating device comprises a vibration device for signaling a selected function or as feedback for a selected function. The vibration device can be arranged at any location of the actuating device as long as the location is adapted to be able to perceptibly convey the vibration signal to a user. Preferably, the vibration device is coupled with the actuating device or a control device, for example, the transmission control device, in such a way that upon activation or deactivation of the parking brake, a vibration signal can be emitted from the vibration device.

According to a preferred embodiment of the present invention, the touch screen is so controlled that predetermined, for example, touched or actuated touch-sensitive fields such as the display and touch field and the confirmation field have a different brightness and/or color than the remaining non-actuated or non-touched fields. Further, the confirmation field may preferably have a brightness and/or color different from the display and touch field. Further preferably the touch screen is controlled such that the intermediate areas lying between the display and touch field and the confirmation field have a different brightness than the touch-sensitive fields. Particularly preferably, the intermediate areas are darker than the display and touch fields and the confirmation field. By controlling the brightness and color, on the one hand the respective fields are readily recognizable and distinguishable for a user and, on the other hand, can indicate to the user a particular performed function such as an actuation or contact of a field or a selected and/or confirmed shift stage. Thus the handling of the actuating device can be further simplified.

Further features and advantages of the invention will become apparent from the following description of preferred embodiments of the invention, with reference to the figures and drawings showing details essential to the invention, and from the claims. The individual features can be realized each individually or collectively in arbitrary combination in a preferred embodiment of the invention.

Figure 2:
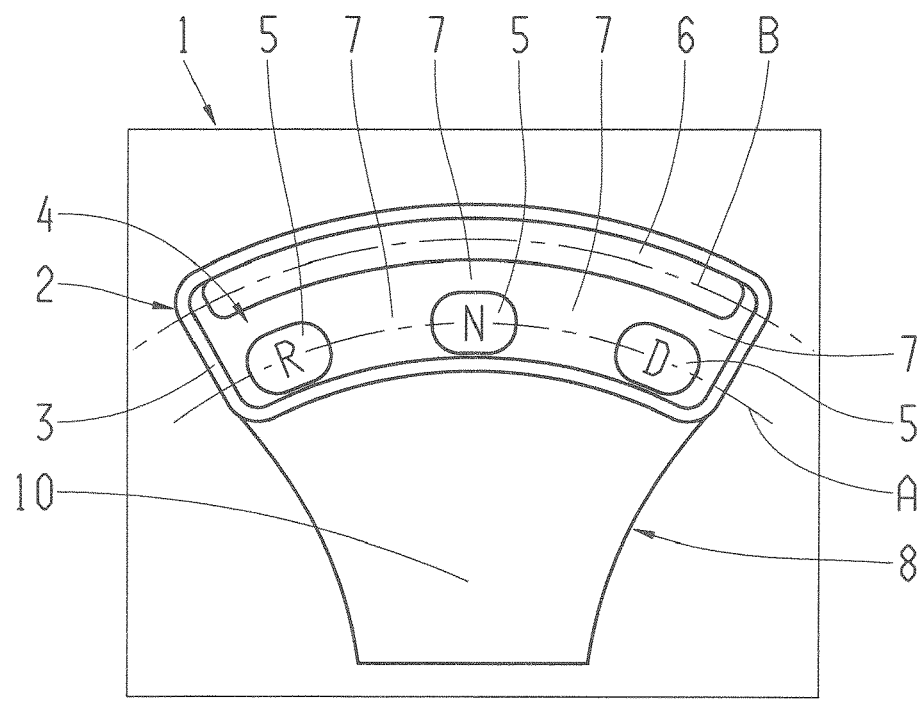
Figure 3:
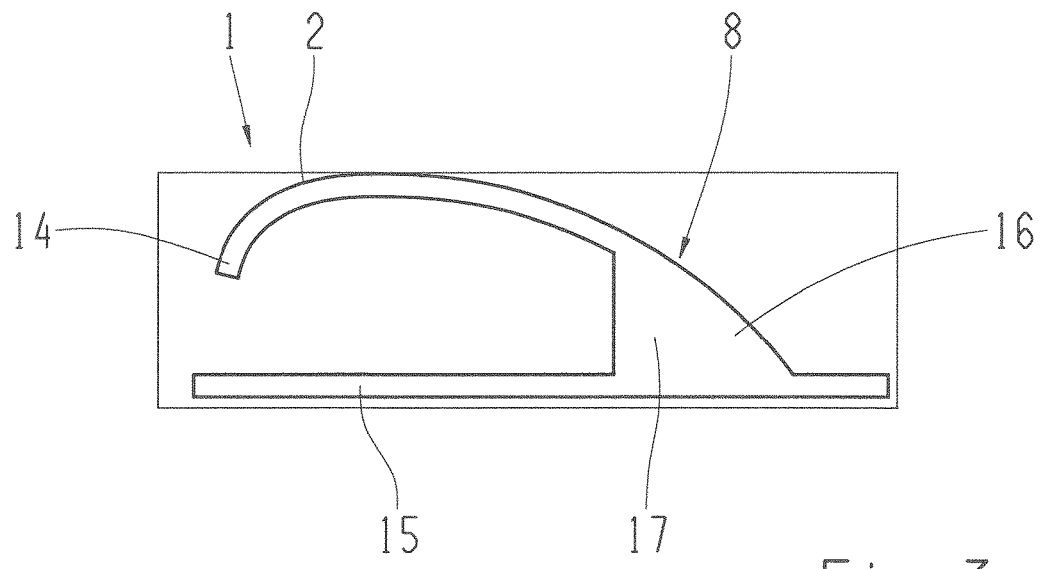
Figure 4:
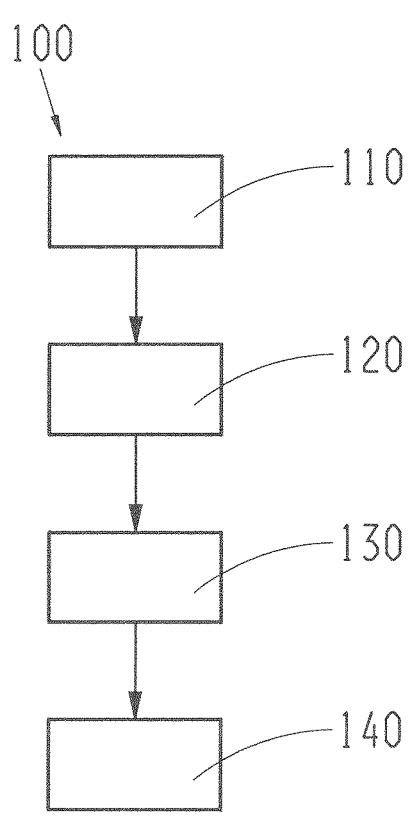

Preferred embodiments of the invention are explained in detail with reference to the accompanying drawings. The figures show:

FIG. 1 shows a schematic plan view of an actuating device according to one embodiment, FIG. 2 shows a schematic plan view of an actuating device according to a further embodiment, FIG. 3 shows a schematic side view of a device according to a further embodiment, and FIG. 4 shows a flow diagram of a method for selecting shift stages of a vehicle transmission.

In the following description of preferred embodiments of the present invention, same or similar reference numerals are used for the elements with the same or a similar effect shown in the various figures and a repeated detailed description of these elements is omitted.

FIG. 1 shows a schematic plan view of an actuating device 1 according to an embodiment. The actuating device 1 comprises a touch screen 2, which is held by a bearing member 8 molded from a plastic material.

The touch screen 2 is placed on the support element 8. The support element 8 has for this purpose a recess for receiving the touch screen 2. Alternatively, the touch screen 2 can be fixed laterally to the support member 8. The touch screen 2 is connected to the support member 8 by means of a latching, screwing, clamping or adhesive bonding. Alternatively or additionally, the touch screen 2 can be held in the recess by a press fit, wherein a frame 3 is provided that encloses the touch-sensitive screen surface 4, which frame can fully absorb the pressure of a press fit so that the pressure can exert no harmful effect on the screen surface 4 of the touch screen. 2. The support element 8 comprises a support 10 adjacent to the touch screen for depositing a hand of a user. The field 10 has a size suitable for the user's hand.

The touch screen 2 comprises a frame 3, which encloses an operable touch-sensitive screen surface 4. The screen surface 4 is divided into three touch-sensitive display and touch fields 5, a touch-sensitive confirmation field 6 and touch-sensitive intermediate regions 7. The display and touch fields 5 and the confirmation field 6 are lined up with the intervening intermediate regions 7 along a curved line shown in FIG. 1 A. The confirmation field 6 is arranged on the outside. The touch screen 2 can thus be designed narrow in longitudinal direction of the actuating device.

The display and touch fields 5 respectively show a black letter symbol R, N, D for a selectable shift stage in which R stands for reverse driving mode, N for neutral and D stands for forward driving mode of the vehicle's transmission. The confirmation field 6 shows the word "Drive" in red letters for the selected and confirmed shift stage D for forward driving mode. The display and touch fields 5 and the confirmation field 6 stand out in their brightness compared to the intermediate areas 7, so that the fields are clearly visible for a user. This can be realized by a different illumination of the appropriate fields. In this case, the touch screen 2 can be controlled such that a touched field is brighter or appears brighter than the other fields by darkening the other fields. This allows signaling the user the operation or touching of the corresponding field.

FIG. 2 shows a schematic plan view of an actuating device 1 according to a further embodiment. In contrast to the embodiment shown in FIG. 1, the confirmation field 6 is arranged adjacent to all display and touch fields 5. Specifically, the confirmation field 6 is arranged adjacent to the display and touch fields 5, which are arranged along the curved first line A, and extends along a second line B shown in FIG. 2 parallel to the arrangement direction of the display and touch fields 5 along the first line A extending from one side of the touch screen 2 up to the opposite side of the touch screen 2. The confirmation field 6 shows a red word "Neutral", which stands for the selected and confirmed shift stage N for neutral position. The center display and touch field 5 shown in the FIG. 2 shows the letter "N" in red. Thus a user is signaled that the shift stage N is active or selected and confirmed. Preferably, the display and touch field 5, which indicates the active shift stage, is deactivated to prevent a multiple selection of the same shift stage.

FIG. 3 shows a schematic side view of an actuating device 1 according to a preferred embodiment, wherein the actuating device 1 can be a corresponding actuating device in FIGS. 1 and 2.

The support element 8 has in cross-section a computer mouse-like surface shape and is configured tableau-like or disc-shaped. The shape of the support element 8 corresponds to an ergonomic shape adapted to a human hand. The support element 8 has a free end 14 which is spaced from a bracket 15 that supports and retains the actuating device 1.

On the side of the support member 8 facing away from the free end 14, the support element 8 comprises an enclosed end 16, which is connected to the bracket 15. The bracket 15 can for example be a housing element or component of a vehicle center console. The enclosed end 16 comprises a bracket 15 connected to the thickening section 17, in which is accommodated a micro-switch for activation or deactivation of a parking brake of the vehicle transmission. For this purpose, the support element 8 is movable relative to the bracket 15 with its area from the free end 14 to the enclosed end 16, wherein the non-shown micro-switch can be effectively switching by pushing or pulling the support element 8. For this purpose, the support element 8 may for example be rotatably connected about an axis of rotation to the bracket 15 in the area of the enclosed end 16. Alternatively, the movement of the support member 8 can be achieved by making the support element 8 of a flexible material, wherein the enclosed end 16 is fixedly clamped into the bracket.

Preferably an actuation direction of the free end 14 is associated with an activation of the parking brake and an opposite actuation direction of the free end 14 is associated with a deactivation of the parking brake.

The support element 8 forms a handle for a user, wherein the support element 8 can be actuated, in particular pulled, either by grasping around the free end 14 or grasping at least one side of the support element 8 leading to the free end 14. Alternatively or additionally, in an area between the free end 14 and the enclosed end 16 a recess can be provided for reaching to actuate, in particular pull, the support element 8 and thus to activate or deactivate the parking brake function.

The touch screen 2 is arranged between the free end 14 and the enclosed end 16 at a place visible to a user from above the actuating device 1.

FIG. 4 shows a flowchart of a method 100 for selecting shift stages of a vehicle transmission with shift-by-wire actuation, for example, by means of an actuating device 1 as described above.

The method 100 includes a step 110 of touching the touch-sensitive display and touch field 5. This starts a selection of the shift stage displayed by the display and touch field 5. Preferably, with the touch of the screen and touch field 5 the other display and touch fields can be deactivated.

In a subsequent step 120 a contacting sweep takes place from the touch screen 2 to the confirmation field 6. The corresponding icon for the selected shift stage can be visually carried by the display and touch field 5 at the touch location. In the actuating device 1 shown in FIG. 1 the contacting sweep is done in lateral direction, when other display and touch fields 5 can be swept, for example, when the shift stage R or N is selected. For this preferred embodiment a prescribed deactivation of at least one or all display and touch fields 5 to be swept is particularly preferred. In the embodiment illustrated by FIG. 2, the contacting sweep is carried out from the respective display and touch field 5 perpendicular or transverse to the direction of arrangement of the display and touch fields 5. For this, none of the other display and touch fields 5 needs to be swept. A prescribed deactivation of the display and touch fields 5 as described above is for this embodiment not mandatory. Furthermore, the path from the display and touch field 5 to the confirmation field 6 is shorter, allowing a more rapid selection and confirmation of a shift stage.

This is followed by a step 130 of transmitting a signal from the actuating device 1, which contains the selected and confirmed shift stage, to a transmission control device. The signal can for example be triggered so that the confirmation box 6 is reached by touching it or only when the confirmation field 6 assumes a non-contact state having been touched, for example, after removing the finger from the confirmation field 6. At the same time, the icon representing the selected and confirmed shift stage can slide back from the confirmation field 6 to its place of origin, the display and touch field 5. This allows to confirm to the user the selected shift stage. The confirmation of the selected shift stage may further be carried out by displaying the shift stage in the confirmation field 6 by means of a corresponding associated symbol or a word and, in addition, by highlighting the displayed symbol or word displayed in the associated display and touch field 5 and the confirmation field 6.

In a subsequent step 140 the transmission controller engages the selected and confirmed shift stage on the basis of the transmitted signal. The engagement of the selected and confirmed shift stage can be displayed to a user by a previously described color highlighting, wherein the color highlighting, for example, of at least the icon indicated in the display and touch field 5 for confirmation of the selected shift stage is omitted. Alternatively or additionally, a short or longer-term blinking of the symbol associated with the shift stage can indicate the engagement of the selected and confirmed shift stage.

Another selection and confirmation of another shift stage and thus a shift stage change can alternately be carried out in the prescribed manner.

The embodiments described and shown in the figures are chosen only by way of example. Different embodiments can be combined completely and with respect to individual features. An embodiment can also be supplemented by one or more features of another embodiment.

REFERENCE NUMERALS

1 Actuating device
2 Touch screen
3 Frame
4 Screen surface
5 Display and touch field
6 Confirmation field
7 Intermediate area
8 Support element
10 Field
14 Free end
15 Bracket
16 Enclosed end
17 Thickening
100 Method
110 First process step
120 Second process step
130 Third process step
140 Fourth process step
A First line
B Second line

The invention claimed is:

1. An actuating device for a selection of shift stages of a vehicle transmission with shift-by-wire actuation, said actuating device comprising:
   a touch screen with at least one touch-sensitive display and touch field for displaying and selecting a selectable shift stage,
   wherein the touch screen further comprises a touch-sensitive confirmation field adjacent to the at least one touch-sensitive display and touch field to confirm and display the selected shift stage, wherein the touch-sensitive confirmation field is coupled to the display and touch field such that by a touching sweep of the touch screen from the display and touch field to the confirmation field, the displayed selectable shift stage can be selected and confirmed for switching the effective position of a gear shifting transmission.

2. The actuating device according to claim 1, wherein different shift stages can be confirmed and displayed by the touch-sensitive confirmation field.

3. The actuating device according to claim 2, wherein the touch screen has several touch-sensitive display and touch fields, on which at least one respective shift stage can be displayed and selected, and a common touch-sensitive confirmation field associated with the display and touch fields, wherein the display and touch fields and the common confirmation field are arranged along a row, and wherein the actuating device controls the touch screen so that when one of the display and touch fields is touched, the touch sensitivity of the other display and touch fields is deactivated.

4. The actuating device according to claim 2, wherein the touch screen has several touch-sensitive display and touch fields, on which at least one respective shift stage can be displayed and selected, and a common touch-sensitive confirmation field associated with the display and touch fields, wherein the display and touch fields are arranged along a row, and wherein the confirmation field is arranged adjacent to the row.

5. The actuating device according to claim 4, wherein a touch sensitivity of the touch screen is controlled so that when touching one of the display and touch fields, the touch sensitivity of the other display and touch fields is deactivated.

6. The actuating device according to claim 1, wherein the touch screen comprises on its screen surface at least one haptic element, wherein the at least one haptic element is located in at least one of:
   an area of the display and touch field,
   an area of the confirmation field,
   an area between two display and touch fields,
   an area between the display and touch field and the confirmation field.

7. The actuating device according to claim 6, wherein the touch screen comprises on its screen surface at least two haptic elements spaced apart from each other and mutually parallel aligned, which extend in the direction of the display and touch field or the confirmation field.

8. The actuation device according to claim 6, wherein the at least one haptic element comprises at least one of:
   a depression,
   an elevation,
   a plurality of point-like depressions,
   a plurality of point-like elevations.

9. The actuating device according to claim 1, wherein the actuating device comprises a handle which forms a handle surface facing a user of the actuating device, on which the touch-sensitive touch screen is arranged, wherein the handle has a switch arranged outside of the touch screen for activating or deactivating a parking brake function of the vehicle transmission.

10. The actuating device according to claim 9, wherein the handle comprises a movable free end and a stationary enclosed end, between which the touch-sensitive touch screen is arranged, wherein on the enclosed end the switch is provided that by moving the free end, the parking brake function is activated or deactivated.

11. The actuation device according to claim 9, wherein the handle surface has an ergonomic shape adapted to a palm of a user.

12. The actuation device according to claim 9, wherein the switch for activating or deactivating the parking brake function of the vehicle transmission occurs by rotating the handle.

13. The actuation device according to claim 9, wherein the switch for activating or deactivating the parking brake function of the vehicle transmission occurs by moving a flexible portion of the handle.

14. The actuating device according to claim 1, wherein the selectable shift stage is confirmed only after the confirmation field achieves a non-contact state.

15. The actuation device according to claim 1, wherein the selected shift stage moves back to its original position after confirmation.

16. The actuation device according to claim 1, wherein the touch screen comprises a plurality of display and touch fields and wherein only one selectable shift stage is assigned to each display and touch field.

17. The actuation device according to claim 1, wherein a touch sensitivity of a selected shift stage is deactivated until a selection and confirmation of another shift stage occurs.

18. The actuation device according to claim 1, further comprising a turntable coupled to the touch screen, wherein the turntable can be used to select a selectable shift stage.

19. The actuation device according to claim 1, further comprising a vibration device configured to provide feedback upon selection or confirmation of a shift stage.

20. A method for selecting shift stages of a vehicle transmission with shift-by-wire actuation with an actuating device, the method comprising:
   touching a touch-sensitive display and touch field on the actuation device
   contacting sweep of the touch field from the display and touch field to a confirmation field on the actuation device in order to select a shift stage
   transmitting a signal containing the selected shift stage from the actuating device to a transmission control device, and
   causing an engagement of the selected shift stage in a speed change gear by the transmission control device based on the transmitted signal.

* * * * *